July 19, 1932.  U. KOHLER  1,867,947
ESCAPEMENT WHEEL FOR ANCHOR ESCAPEMENTS
Filed Dec. 6, 1930
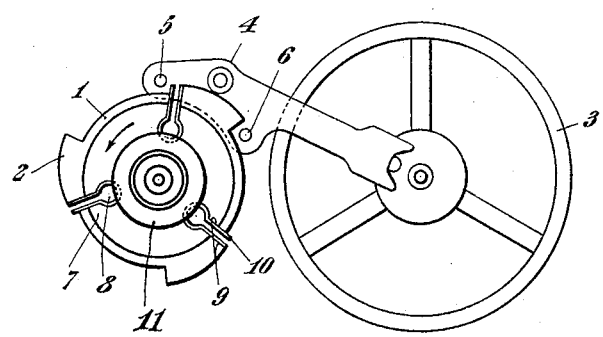
Inventor:-
Ulrich Kohler Patented July 19, 1932

1,867,947

UNITED STATES PATENT OFFICE

ULRICH KOHLER, OF BERN, SWITZERLAND, ASSIGNOR TO HASLER A.-G. VORMALS TELE-GRAPHENWERKSTÄTTE VON G. HASLER, OF BERN, SWITZERLAND, A CORPORATION OF SWITZERLAND

ESCAPEMENT WHEEL FOR ANCHOR ESCAPEMENTS

Application filed December 6, 1930, Serial No. 500,621, and in Switzerland January 10, 1930.

This invention relates to escapement wheels for clockwork comprising anchor escapements.

When escapement wheels are of large size, for example in anchor escapements of the mechanism of speed recorders, the defect is met with that the teeth of the wheel striking against the release pin of the anchor cause a noise which under certain circumstances is annoying.

The present invention has for one of its objects to obviate or greatly reduce such noise.

To this end, according to the invention, the abutment or striking faces of the teeth of the escapement wheel are constructed so as to be resilient.

According to a feature of the invention, the said faces of the teeth are constituted by leaf springs let into the body of the wheel.

In a preferred construction of wheel according to the invention, its body has in one side an annular or circular central recess, and a plurality of radial slots at the rim, one in front of each tooth, pins are provided in line with the slots in the recess, and springs are mounted one on each pin, which springs extend outwards through the adjacent slot and provide the resilient faces of the teeth.

In the accompanying drawing one form of escapement wheel is illustrated by way of example in side elevation.

Referring to the drawing, the escapement wheel 1 has only three teeth 2, with which cooperates an anchor 4 that acts on a balance wheel 3 and carries two pins 5 and 6. One side of the wheel 1 has a central circular recess 7, in which are three pins 8. In front of each tooth 2 the rim of the wheel has a radial slot 9, in each of which lie the limbs of a U-shaped leaf spring 10. At their closed ends these U-springs are widened to assume a circular shape and are placed each around one of the pins 8 which are situated each on the same radius as its allotted slot 9. A disc 11 fast on the nave of the wheel prevents the springs 10 from leaving the pins 8.

One of the two outer ends of each spring 10 lies against one side face of a tooth 2, whilst the other is spaced away a short distance therefrom and lied freely apart from the first-mentioned end. The free end of this limb extending freely radially outwards constitutes the striking or rest face of a tooth and when cooperating with the armature hits against the starting pin 5 of the anchor at each release movement of the escapement wheel. The striking or rest face yields, whereby the blow of the wheel and with it the noise of the blow is damped.

The striking or rest faces of the teeth of the wheel may, of course, be rendered elastic or yielding in some other way than that illustrated; for example, instead of the U-shaped springs 7 simple leaf or blade springs, or spring-loaded arms, may be mounted on the pins 8.

The described escapement wheel may be used in clocks serving as timekeepers, and also in clockwork for driving the time spindle of speed recorders and the like.

The invention is not restricted to the precise constructional details enumerated.

I claim:—

1. An escapement wheel having a plurality of radial slots terminating each at the side of a tooth of the wheel, and a plurality of leaf springs, one in each slot, constituting each the side face of the adjacent tooth.

2. An escapement wheel having a plurality of radial slots terminating each at the side of a tooth thereof, and a plurality of U-shaped leaf springs, one in each slot, having each one limb bearing against the side face of the adjacent tooth and the other limb spaced freely away therefrom.

3. An escapement wheel having in one side an annular recess, and radial slots in the rim, one at the side of each tooth, a plurality of pins, one in line with each slot, in said recess, and a plurality of springs, one mounted on each pin, extending outwards through the adjacent slot.

4. A toothed escapement wheel for use with a palette fork, having a plurality of springs each spaced in advance of a leading side face of a tooth of the wheel, and adapted to resiliently contact with the palette fork.

Signed at Bern, this 26th day of November, 1930.

ULRICH KOHLER.